United States Patent [19]

Watanabe et al.

[11] Patent Number: 5,115,400

[45] Date of Patent: May 19, 1992

[54] CAD/CAM APPARATUS

[75] Inventors: Kotaro Watanabe; Tetsu Itaba, both of Aichi, Japan

[73] Assignee: Mitsubishi Denki Kabushiki Kaisha, Tokyo, Japan

[21] Appl. No.: 501,821

[22] Filed: Mar. 30, 1990

[30] Foreign Application Priority Data

May 8, 1989 [JP] Japan ................................. 1-114645

[51] Int. Cl.[5] ..................... G06F 15/46; G05B 19/403
[52] U.S. Cl. ........................... 364/474.24; 364/474.25; 364/474.26
[58] Field of Search ...................... 364/474.22–474.27, 364/191–193, 474.02; 318/568.1

[56] References Cited

U.S. PATENT DOCUMENTS

| | | | |
|---|---|---|---|
| 4,521,860 | 6/1985 | Kanematsu et al. | 364/474.25 |
| 4,736,306 | 4/1988 | Christensen et al. | |
| 4,788,481 | 11/1988 | Niwa | 364/474.26 X |
| 4,788,636 | 11/1988 | Shiratori et al. | 364/474.25 X |
| 4,837,703 | 6/1989 | Kakazu et al. | 364/474.25 X |
| 4,998,196 | 3/1991 | Seki et al. | 364/474.25 X |

FOREIGN PATENT DOCUMENTS

| | | |
|---|---|---|
| 305537 | 8/1989 | European Pat. Off. |
| 2598000 | 4/1987 | France |
| 176731 | 8/1987 | Japan |
| 224550 | 10/1987 | Japan |
| 2140937 | 12/1984 | United Kingdom |
| 2163928 | 3/1986 | United Kingdom |
| 2187308 | 9/1987 | United Kingdom |

OTHER PUBLICATIONS

Intelligente Bedienfunktionen, pp. 48–54; date unknown.

Primary Examiner—Joseph Ruggiero
Attorney, Agent, or Firm—Sughrue, Mion, Zinn, Macpeak and Seas

[57] ABSTRACT

A CAD/CAM apparatus is adapted such that each set of machining process information representative of machining attributes and the relative machining path and the order of machining are stored in a storage portion associated with each geometric element of each shape of an object, and the machining process information can be modified according to the need and stored again by a machining process edition portion, whereby it is made possible to input information relative to specifications of machining methods in an interactive manner with the display screen. The apparatus is further adapted such that NC data for machining a geometric shape are generated based on the information stored in its storage portion, whereby, differing from prior art apparatuses, it is enabled, even when there are mixed particular specifications of machining conditions for individual part of a geometric shape of the object and a common specification of machining conditions for a unit of geometric shape of the object, to output the NC data for all the shapes in a lump. Further, it is adapted such that any desired portion of the sets of machining process information stored in the storage portion associated with geometric elements can be selectively modified in the machining process edition portion so that new NC data based on the modified machining process information are provided, thereby eliminating the need for re-defining geometric shapes over again in contrast with the prior art apparatuses and enabling the NC data incorporating the modified machining process information to be formed easily and quickly.

6 Claims, 18 Drawing Sheets a b

FIG. 6
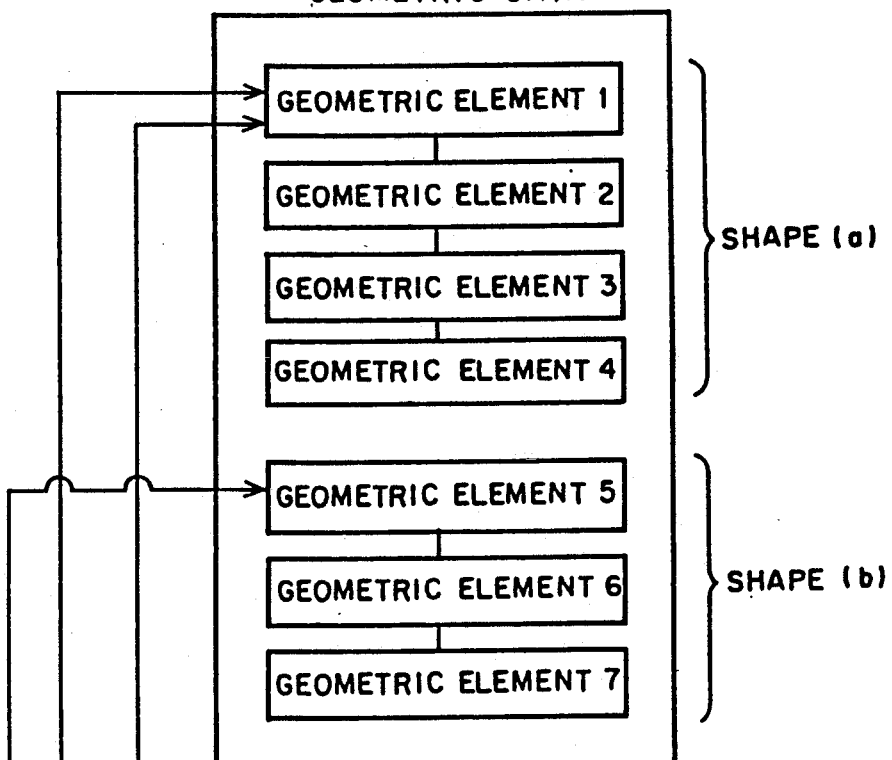
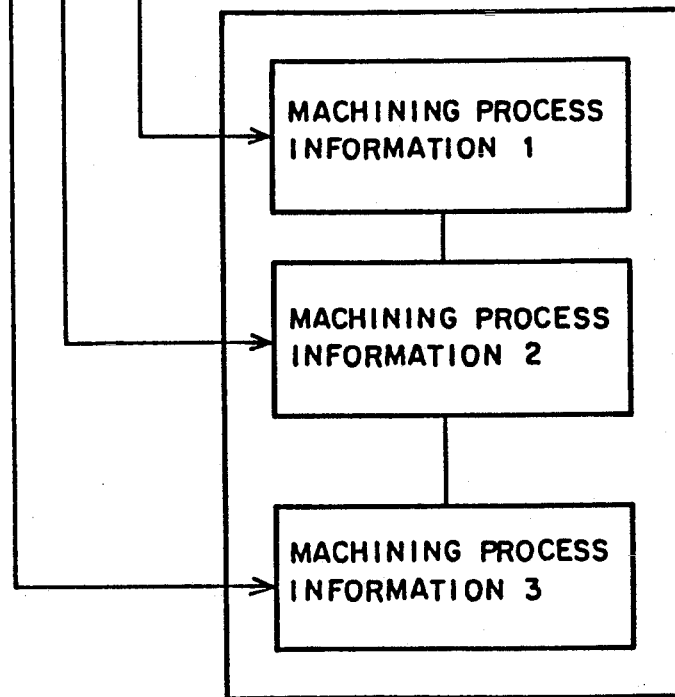

FIG. 7 (a) GENERATED SHAPE
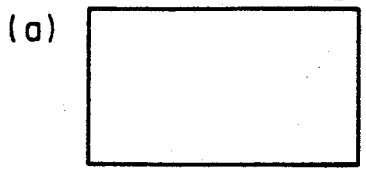
FIG. 7 (b)
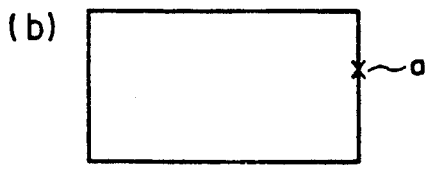
FIG. 7 (c) DIRECTION OF INCLINATION
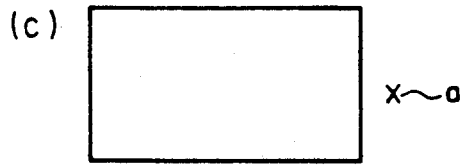
FIG. 7 (d)
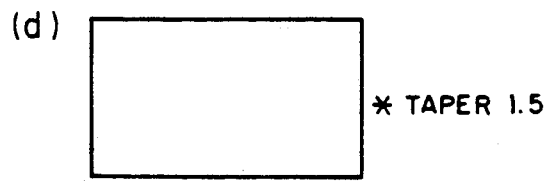
FIG. 7 (e)
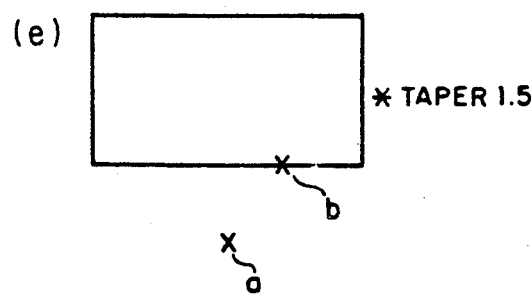
FIG. 9
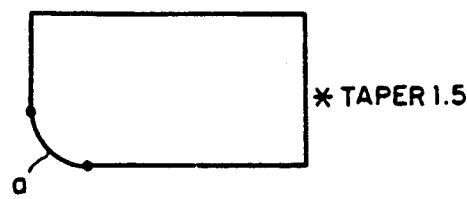

FIG. 8 (a)
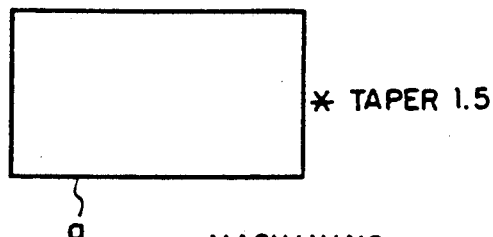
✳ TAPER 1.5
⊠ MACHINING PROCESS 1
FIG. 8 (b)
| TYPE OF MACHINING PROCESS | TYPE 1 | | |
|---|---|---|---|
| MACHINING DIRECTION | LEFT | | |
| MACHINING SPEED | 40 | | |
| OFFSET DIRECTION | RIGHT ✕ | | |
| | | | |
FIG. 8 (c)
MACHINING PATH
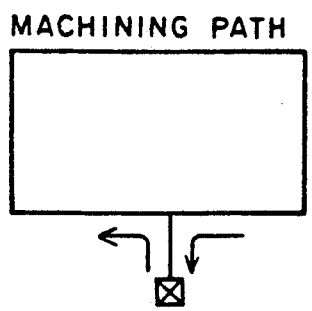
FIG. 8 (d)
```
M 80
G 90
G 92 X100 Y100
G 01 X100 Y150 F40
```

FIG. 23

MACHINING PROCESS TABLE

| COMPLETE / QUIT | | | | |
|---|---|---|---|---|
| TYPE OF MACHINING PROCESS | NORMAL MACHINING | REVERSE MACHINING | REVERSE GAPPING | |
| OFFSET DIRECTION | LEFT | LEFT | LEFT | |
| ADVANCING DIRECTION | LEFT | LEFT | LEFT | |
| OFFSET NUMBER | 1 | 2 | 3 | |
| E PACK NUMBER | 51 | 52 | 53 | |
| MACHINING SPEED (mm/min.) | 3 | 3 | 3 | |
| APPROACH DISTANCE (mm) | 5 | ******** | ******** | |
| ARC APPROACH RADIUS (mm) | 0.3 | 0.3 | 0.3 | |
| NON-CUT OFF AMOUNT (mm) | 2 | 2 | 2 | |
| RELIEF AMOUNT (mm) | 1 | 1 | 1 | |
| INNER MINIMUM R (mm) | 0.2 | 0.2 | 0.2 | |
| OUTER MINIMUM R (mm) | 0.2 | 0.2 | 0.2 | |
| AUTO-OVER-SIZE FINISHING ALLOWANCE (mm) | xxxxxxxx | xxxxxxxx | xxxxxxxx | |
| CUTTING EDGE TAPER ANGLE (°) | 0 | 0 | 0 | |

CAD/CAM APPARATUS

BACKGROUND OF THE INVENTION

1. Field of the Invention

The present invention relates to a CAD/CAM apparatus for generating on a display screen a geometric shape of an object to be machined in an interactive manner with the display screen thereby generating NC data for machining the shape.

2. Description of the Prior Art

FIG. 1 is a structural drawing showing a CAD/CAM apparatus using a prior art method disclosed in, for example, Japanese Laid-open Patent Publication No. 62-214405. Referring to the figure, reference numeral 1 denotes an input unit such as keyboard, mouse, and tablet, 2 denotes a CPU for performing various processes, 3 denotes an output unit such as CRT, printer, plotter, puncher, and disk, 4 denotes a geometric shape generation portion for defining and editing geometric elements such as straight lines, circles, and curves on the display screen in an interactive manner for generating a geometric shape as an object of machining, 53 denotes a machining starting point input portion for inputting a machining starting point, 54 denotes a machining direction input portion to input a direction along which machining is advanced from the machining starting point, 9 denotes a geometric data memory for storing geometric data generated in the geometric shape generation portion 4, and 55 denotes an NC data generation portion for generating NC data from the geometric data, machining starting point information, and the machining direction information.

Operation of the apparatus will be described below FIG. 7(a) is an example of a shape of an object to be machined generated by the geometric shape generation portion 4. The shape as the object of machining is given a machining starting point a by the machining starting point input portion 53 as shown in FIG. 2(a). Then, by inputting, for example, "up" as a direction along which the machining is advanced from the machining starting point, the machining direction is input. Then, the NC data generation portion 55 generates the path from the machining starting point to the shape and, tracing the shape, outputs NC data [FIG. 2(b)].

We now consider the case to machine a plurality of different shapes as shown in FIGS. 3(a) and 3(b) under different machining conditions. Since it is not possible to assign the machining conditions such as machining speeds in association with the individual shapes, the machining starting point and machining direction are specified as described above for the shape a after the shapes have been generated, and then, after machining conditions are specified for the shape, the NC data is produced therefor. Then after machining conditions suitable for the shape b have been specified, the machining starting point and machining direction as described above are specified for the shape b and, thus, the NC data therefor is produced.

As another prior art example of the described type of CAD/CAM apparatus, there is one as shown in FIG. 4. Referring to the figure, reference numeral 1a denotes a keyboard, 2a denotes a mouse, and 3a denotes a tablet constituting the input unit for inputting geometric information and character data Reference numeral 4a denotes a geometric shape generation portion converting the geometric information into information in the format to be internally stored, 41a denotes a machining method input portion for inputting machining information, 6a denotes a geometric shape memory for storing the geometric information, 9a denotes a shape analysis portion, 11a denotes an NC information generation portion, and 12a denotes a machining path display portion, of which the NC information generation portion 11a and the machining path display portion 12a are the portions finally outputting an NC program and a machining path diagram.

Operation according to the above described arrangement will be described below. First, geometric information is input through the input unit such as the keyboard 1a, mouse 2a, and tablet 3a. The geometric shape generation portion 4a converts the input geometric information into information adapted to the internal storage format This information is stored in the geometric shape memory 6a. Further, characters input by the operator through the machining method input portion 41a are converted into machining information and stored in the geometric shape memory 6a in parallel with the geometric information. The geometric shape analysis portion 9a generates machining path information for generating the NC program from the information stored in the geometric shape memory 6a. The NC information generation portion 11a provides the machining path information with other NC information, thereby outputting the NC program, and in the meantime, the machining path display portion converts the machining path information into a set of graphic information and displays it on a CRT as a display portion 14a.

Since prior art CAD/CAM apparatuses are configured as described above, in the case of the first prior art example, for example, if the object to be machined has a plural kinds of shapes to be machined, it is impossible to assign or store the machining conditions or the like in association with every shape of the object. Therefore, when the machining condition must be changed for each shape, the machining condition must be assigned every time, that is, the processes for establishing the machining conditions and generating NC data have had to be repeated for every shape. Thus, there has been a problem that the efficiency of NC programming has been low. Further, specification of a machining method such as tapering for a specific portion of the shape has not been achievable by the operator in an interactive manner with a display screen.

In the case of the second prior art example, assignment of the machining information has been possible only to the whole of the produced set of geometric information. Therefore, when such an NC program is wanted in which a portion of the geometric information is to be machined under a different machining condition from that under which another portion is machined, there has been a problem that the definition of the geometric shape must be made by dividing the shape into two different shapes. Hence, the greater the number of the shapes and the types of the machining, the more remarkably low was the efficiency of NC programming.

SUMMARY OF THE INVENTION

The present invention was made to overcome the above enumerated problems Accordingly, it is an object of the present invention to provide a CAD/CAM apparatus enabled to specify both of a machining method for a part of a shape and a machining method for the whole of the shape and store the information to specify the methods of machining in association with the part and the whole of the shape, so that the information to specify the methods of machining can be displayed on a display screen in association with the shape, and further, adapted to allow information of methods of machining to be specified on the display screen as an object of edition and to provide a set of NC data with which a plurality of different shapes can be machined in a lump. It is another object of the present invention to provide a CAD/CAM apparatus adapted to allow the pieces of information relative to specifications of the methods of machining to be edited, so that, even when the machining process is changed for machining of a shape, a new NC program incorporating the different machining type can be generated without re-defining the shape of the object once again in the new NC program.

A CAD/CAM apparatus according to a first aspect of the present invention comprises a geometric shape generation means for generating various geometric shapes to be machined in an interactive manner with a display screen, a machining attribute definition means for defining a machining attribute to be assigned according to the need to a geometric element of each shape to be machined, a machining process definition means for defining a machining process including a machining path, machining order of each geometric element of the shape to be machined, a storage portion for storing machining attribute information and machining process information for each geometric element of each shape to be machined, a machining process edition means for re-editing the machining process information stored in the storage portion over again according to a change in machining conditions, and an NC information generation means for generating and outputting NC information on various shapes to be machined including the machining attribute information and the machining process information for each geometric element of each shape to be machined.

A CAD/CAM apparatus according to a second aspect of the present invention comprises a geometric shape generation means for generating a geometric shape to be machined in an interactive manner with a display screen, a machining declaration means for selecting geometric elements of each shape to be machined, generating sets of machining process information formed of various kinds of machining information specifying machining processes of the geometric elements, and storing in a storage means the sets of machining process information associated with the corresponding geometric elements, an NC information generation means for determining a machining path based on the sets of machining process information and the geometric elements corresponding to the sets of machining process information to thereby generate NC information, and a machining process edition means, which includes a machining process information selection means for selecting a set of machining process information from the storage portion by specifying one among the geometric elements of the geometric shape of which a machining declaration has already been made, an identification name and number of the set of machining process information of which a machining declaration has already been made a machining process table display means for displaying the selected machining process information in a form of a machining process table on the display screen, the machining process table displaying types of the machining and items corresponding to the type of the machining process in columns (or in rows) and plural process items indicating the machining order in rows (or in columns) of the table, an input item position specification means for selecting any desired item input position in the machining process table, an item input means for inputting numerical value to the input item position, and a machining process information storage means for storing the input numerical value as machining process information.

The above and other features and advantages of the present invention will become apparent from the following description with reference to the accompanying drawings.

BRIEF DESCRIPTION OF THE DRAWINGS

FIGS. 5(a) and 5(b) and FIG. 6 are drawings showing data structures;

FIGS. 7(a) through 7(e) and FIG. 8(a) are drawings showing a picture displayed on a display;

FIG. 8(b), and FIG. 8(c) are drawings respectively showing a machining process table and a machining path diagram displayed on a screen;

FIG. 8(d) is a drawing showing an output set of NC data;

FIG. 9 is a drawing showing a state of a geometric shape correction;

FIG. 23 is a drawing showing contents of a machining process table used for edition of machining processes.

DETAILED DESCRIPTION OF THE PREFERRED EMBODIMENTS

Figure 10:
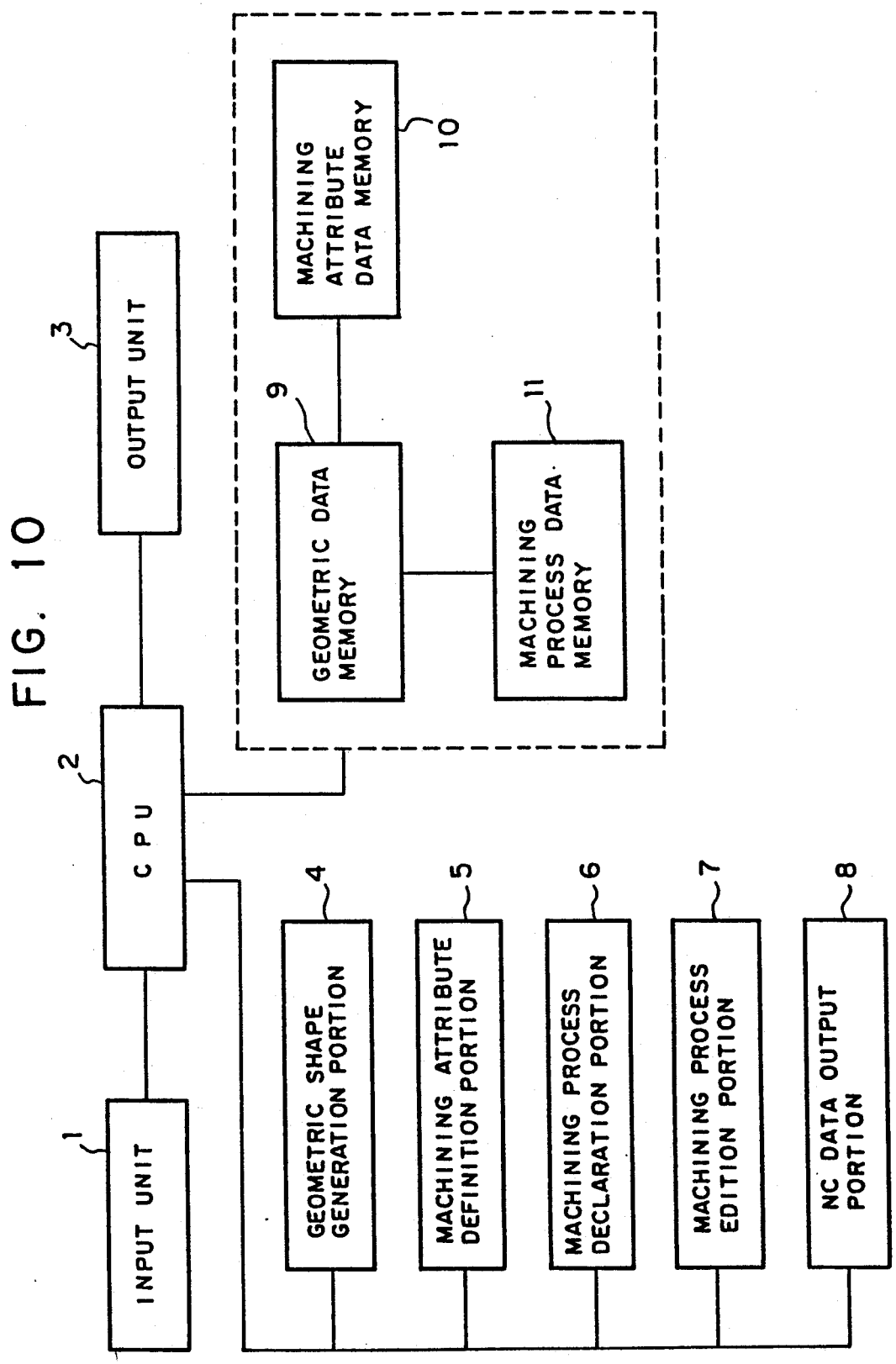
FIG. 10 is a block diagram showing a CAD/CAM apparatus of an embodiment according to a first aspect of the present invention.

An embodiment according to a first aspect of the present invention will be described below with reference to the accompanying drawings FIG. 10 is a structural block diagram of an apparatus of the present embodiment, in which reference numerals 1 to 4 denote like parts in the prior art apparatus, 5 denotes a machining attribute definition portion for defining machining attributes for specifying machining such as taper machining, machining with corner R's specified for upper and lower planes, and machining shapes different between upper and lower planes, 6 denotes a machining process declaration portion for generating a piece of machining process information by inputting the machining starting point first and the geometric element to be machined after the machining starting point, 7 denotes a machining process edition portion for displaying the declared machining process information so that values of items are input and set up, 8 denotes an NC data output portion for generating NC data from produced data such as geometric data, machining attribute data, and machining process data and outputting the data from the output unit, 9 denotes a geometric data memory for storing geometric data generated in the geometric shape generation portion 4, 10 denotes a machining attribute data memory for storing the machining attribute data defined in the machining attribute definition portion 5, and 11 denotes a machining process data memory for storing the machining process data declared in the machining process declaration portion 6 and becoming an object of edition in the machining process edition portion 7.

Operation of the apparatus will be described with reference to flow charts of FIG. 11 to FIG. 15. Here, it is considered that a shape as shown in FIG. 8(a) is machined. In the geometric shape generation (step ST4), geometric elements are defined and edited in an interactive manner on the display screen and the shape shown in FIG. 8(a) is generated. At this moment, there is no need for considering the machining to follow and the shape can be generated in any order. Also, there is no need for declaring it to be a unit of machining of a group, or for storing it in a specific picture layer (or, "layer" as the term used in the CAD system). In case other than machining the circumference of this shape vertically (called "straight machining") (i.e., the case of YES in step ST5S), definition of machining attribute is performed (step ST5). The flow of operations in this process is shown in FIG. 12. First, taper machining is selected as the kind of machining attribute (step ST51). Then, a geometric element as an object to which the machining attribute (i.e., taper machining) is given [a in FIG. 7(b)] is selected (step ST52). Then, the flow branches according to the kind of the machining attribute (step ST53), and a taper angle (e.g., 1.5) is input as additional information to be given (step ST54). Then, to specify the direction of inclination of the taper face, a point [point a in FIG. 7(c)] is input (step ST55). Likewise, if the machining attribute is machining with the corner R's assigned to both upper and lower planes, corner R radii are input (step ST56) after the branching (step ST53). The thus input machining attribute data are stored, in association with the corresponding geometric element, in the machining attribute data memory 10 [FIG. 5(a)] (step ST57). The geometric element 2 in FIG. 5 (a) corresponds to the point a in FIG. 7(c). At the same time, to facilitate confirmation of the input information, it is displayed on the display screen [FIG. 7(d)] (step ST58). In FIG. 7(d), "TAPER" shows that the machining attribute information is taper machining, "1.5" shows that the taper angle, as additional information, is 1.5, and "*" indicates the direction of the inclination. The above described steps ST51 to ST58 are repeated required number of times (step ST5F).

Figure 1:
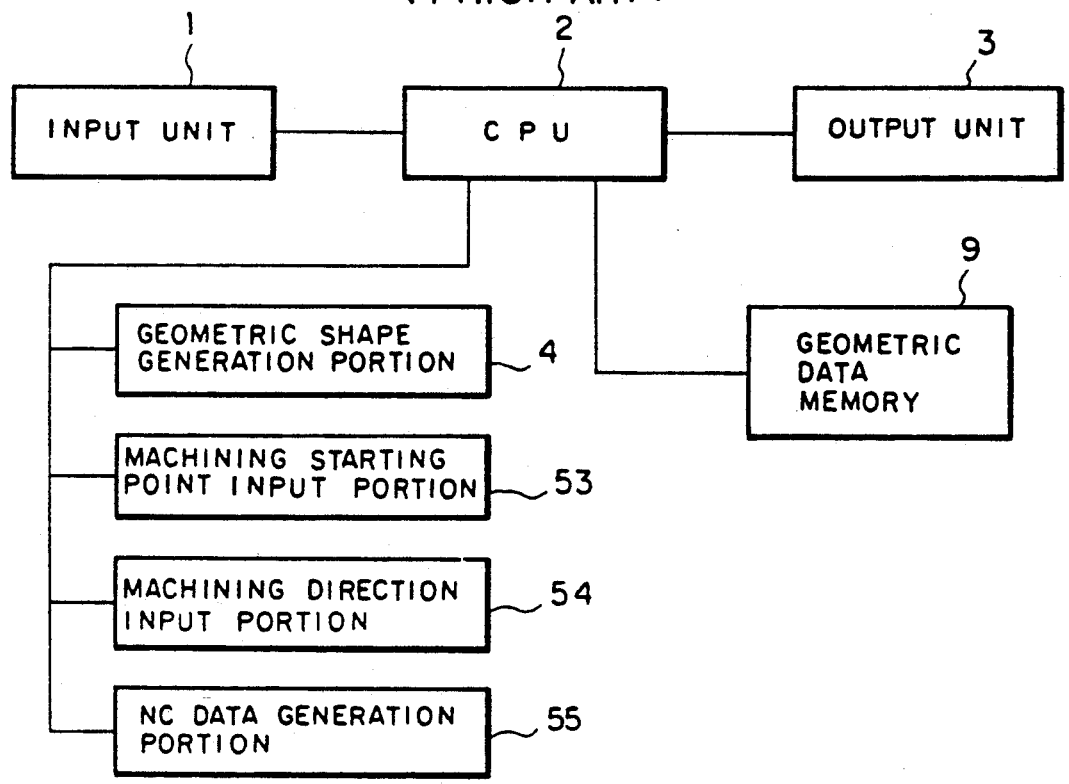
FIG. 1 is a block diagram showing a prior art CAD/CAM apparatus as a first example.
Figure 2A:
FIGS. 2(a) and 2(b) are explanatory drawings of operation of the apparatus shown in FIG. 1.
Figure 2B:
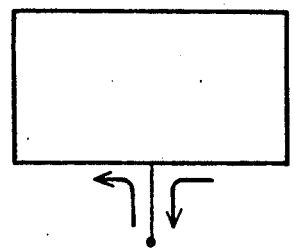
Figure 13:
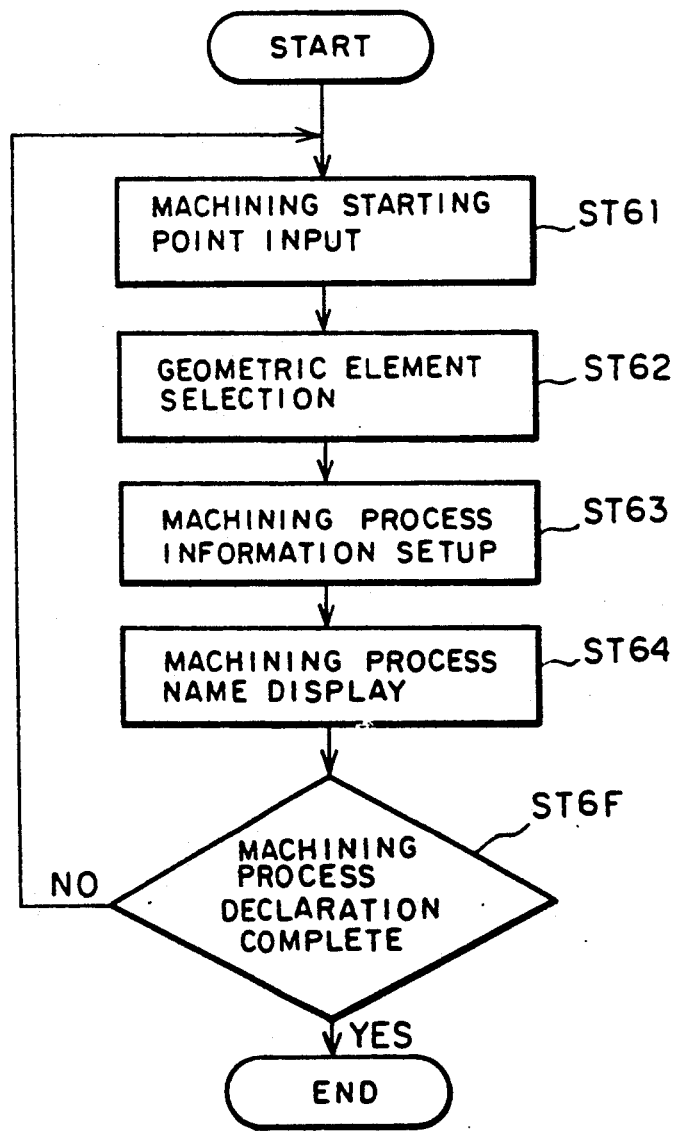
FIG. 12 to FIG. 15 are each a detailed partial flow chart of the flow chart shown in FIG. 11.
Figure 4:
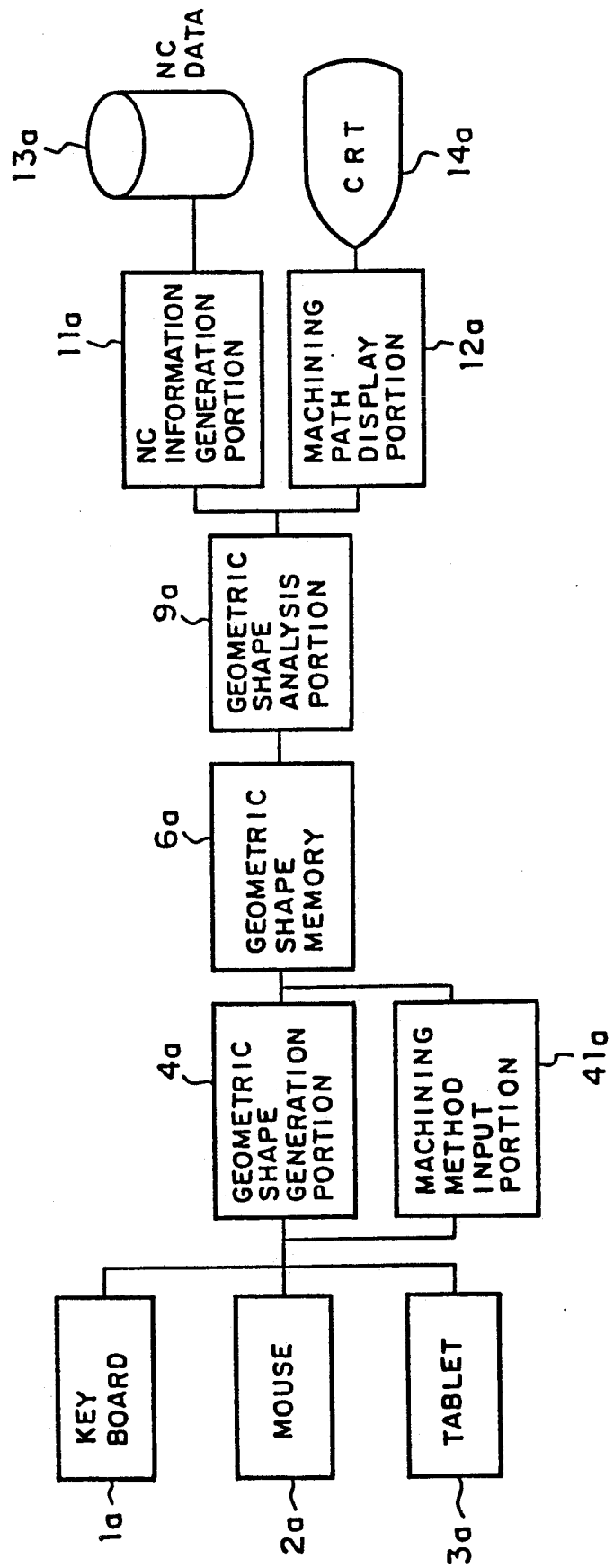
FIG. 4 is a block diagram showing a prior art CAD/CAM apparatus as a second example.

Returning to FIG. 11, declaration of machining process is performed (step ST6). The flow of operations in this process is shown in FIG. 13. First, the machining starting point (point a in FIG. 2(a) is input (step ST61).

Then, the first geometric element to be machined, which is machined first after starting the machining at the machining starting point (the so-called approach element), is selected [point b in FIG. 7(e)] (step ST62). At this point of time, it is internally decided that a new machining process has been defined, and thus, machining process information 1 is established in the machining process data memory 11, and at the same time, it is associated with the corresponding shape [FIG. 5(b)] (step ST63). Thereupon, the fact that what has been generated is the machining process information 1 is displayed by the name of the machining process placed on the screen [FIG. 8(a)] (step ST64). The above steps ST61 to ST64 are repeated the number of times corresponding to the number of the geometric shapes to be machined (step ST6F).

Figure 14:
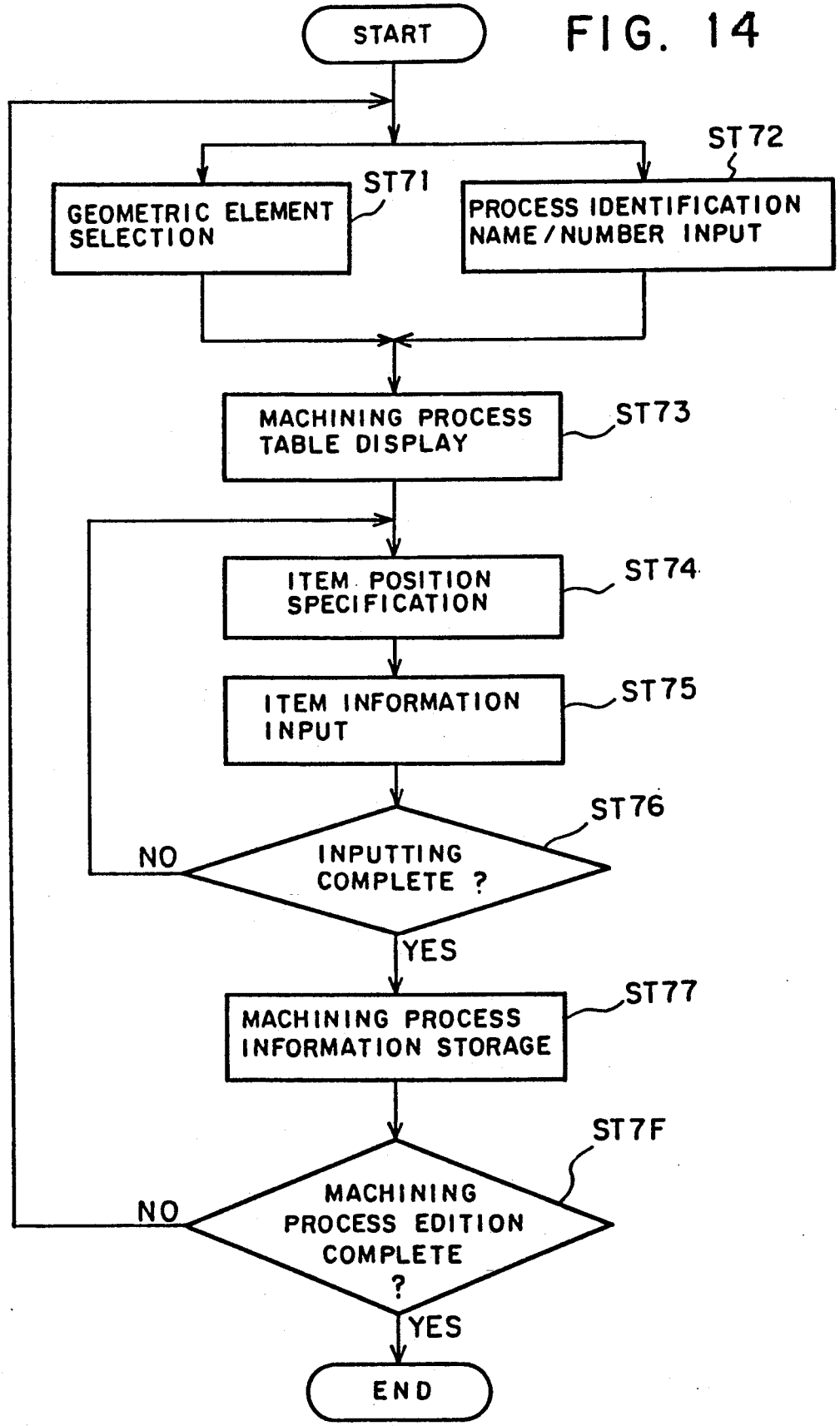

Returning to FIG. 11, when it is necessary to confirm/edit the above obtained machining process information (YES in step ST7S), machining process edition is performed (step ST7). Flow of operations in this process is shown in FIG. 14. First, by selecting the geometric element a in FIG. 8(a), it is input that the object of edition is the machining process 1 (step ST71). Alternatively, the number "1" may be input or the indication "PROCESS 1" in FIG. 8(a) may be selected (step ST72). Thereupon, the designated machining process information is placed on the display as a machining process table in a table format [FIG. 8(b)] (step ST73). This enables the operator to easily confirm the machining process information. When it is desired to change contents of some item in the table, a position of the item [for example, the point a in FIG. 8(b)] may be specified (step ST74) with the use of a mouse, tablet, cursor control key, or the like and the information to be set therein is input (step ST75). When the change has been finished (YES in step ST76), the contents of the set items are stored into the machining process data memory 11 (step ST77). The above steps ST71 to ST77 are repeated the number of times corresponding to the number of the machining processes (step ST7F).

Figure 5A:
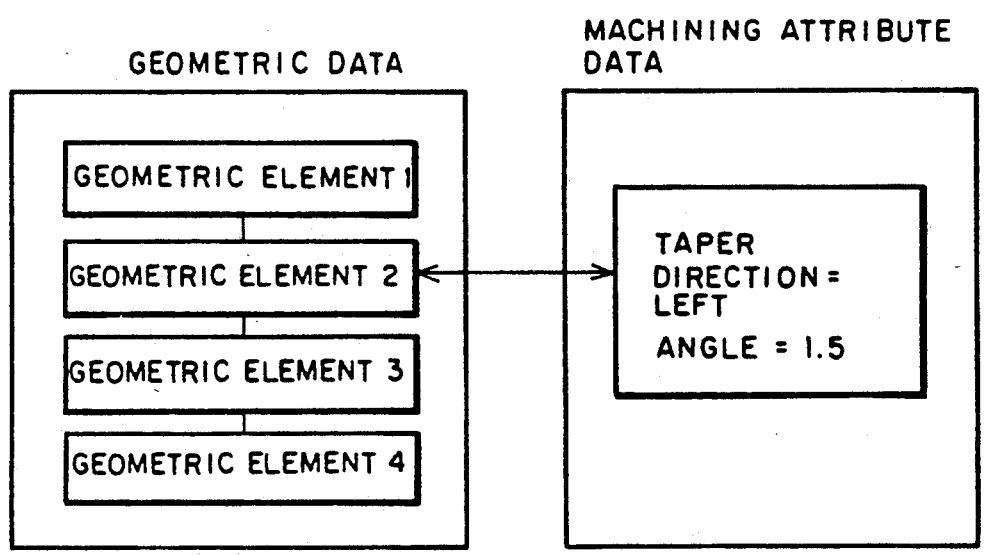
Figure 5B:
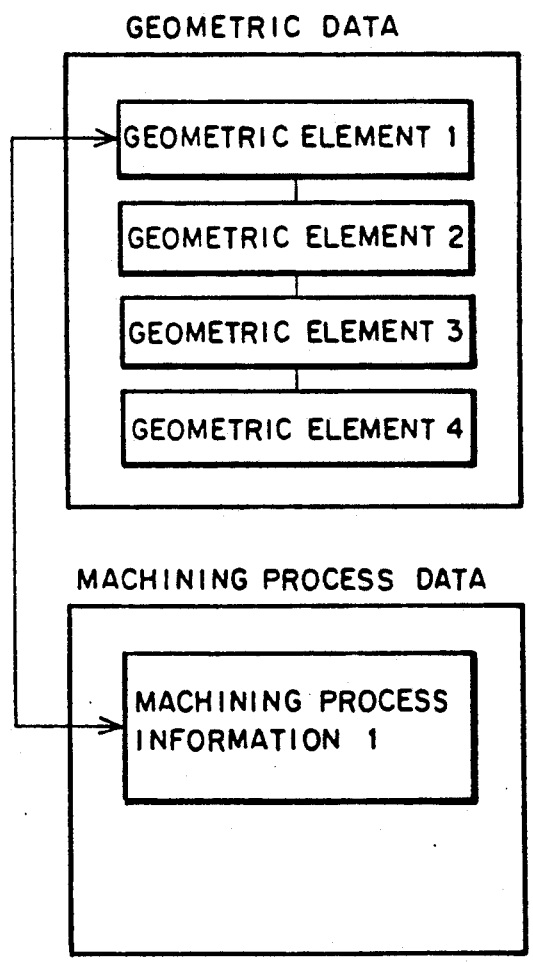
Figure 15:
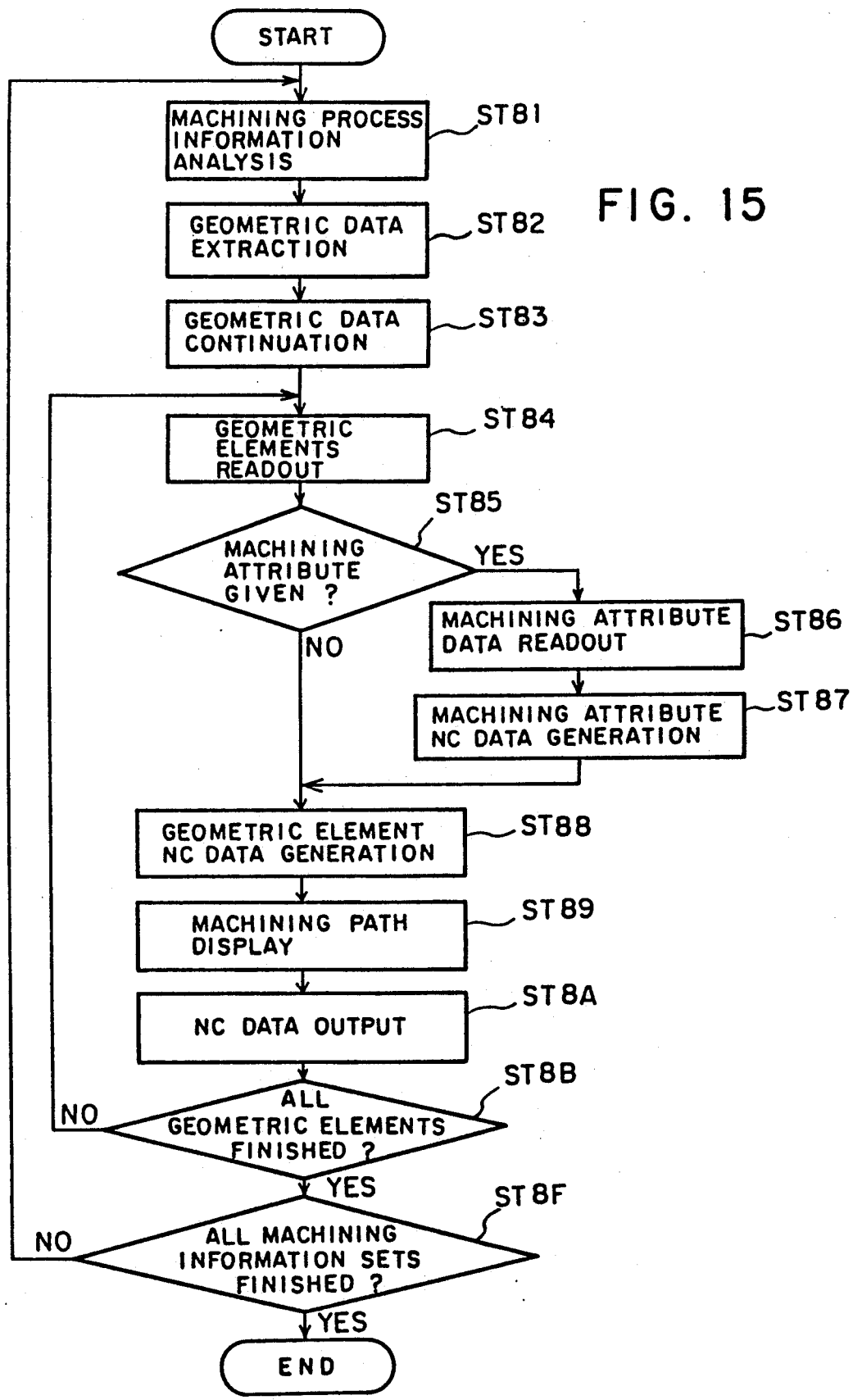

Returning to FIG. 11, NC data outputting is performed (step ST8). Flow of operations in this process is shown in FIG. 15. First after this NC data outputting routine is started, the sets of machining process information in the machining process data memory 11 are sequentially analyzed (step ST81). In the case of FIG. 5(b), the machining process information 1 is analyzed, so that the geometric data are extracted (step ST82). Then, the geometric data are rearranged so that endpoints of the geometric elements are connected with each other (step ST83). Then, the geometric elements are taken out from the rearranged geometric data one by one (step ST84). In the case where instructions to machining in reverse direction are made in the machining process information, the geometric elements are taken out in the reverse direction. Whether or not the geometric element taken out is given a machining attribute is checked (step ST85) and, if it is given one, the machining attribute data is taken out (step ST86). In the case of FIG. 5(a), the machining attribute data "TAPER" is taken out in relation to the geometric element 2. Then, from the machining attribute data, NC data (for example, "A15000" from angle 1.5) is generated (step ST87). Then, from the geometric element, NC data (for example, "X100Y200") is generated (step ST88). If there is any other NC data of machining attribute, they are combined at this point (for example, "X100 Y200 A15000"). Then, the machining path is displayed from the geometric element (step ST89) and the NC data generated as above are output to various peripheral equipment (step ST8A). The above steps ST84 to ST8A are repeated for every geometric data corresponding to one set of machining process information (step ST8B) and, further, the steps ST81 to ST8B are repeated for every machining process information in the machining process data (step ST8F). Thus, the machining path is displayed [FIG. 8(c)] and the NC data [FIG. 8(d)] are output.

Figure 11:
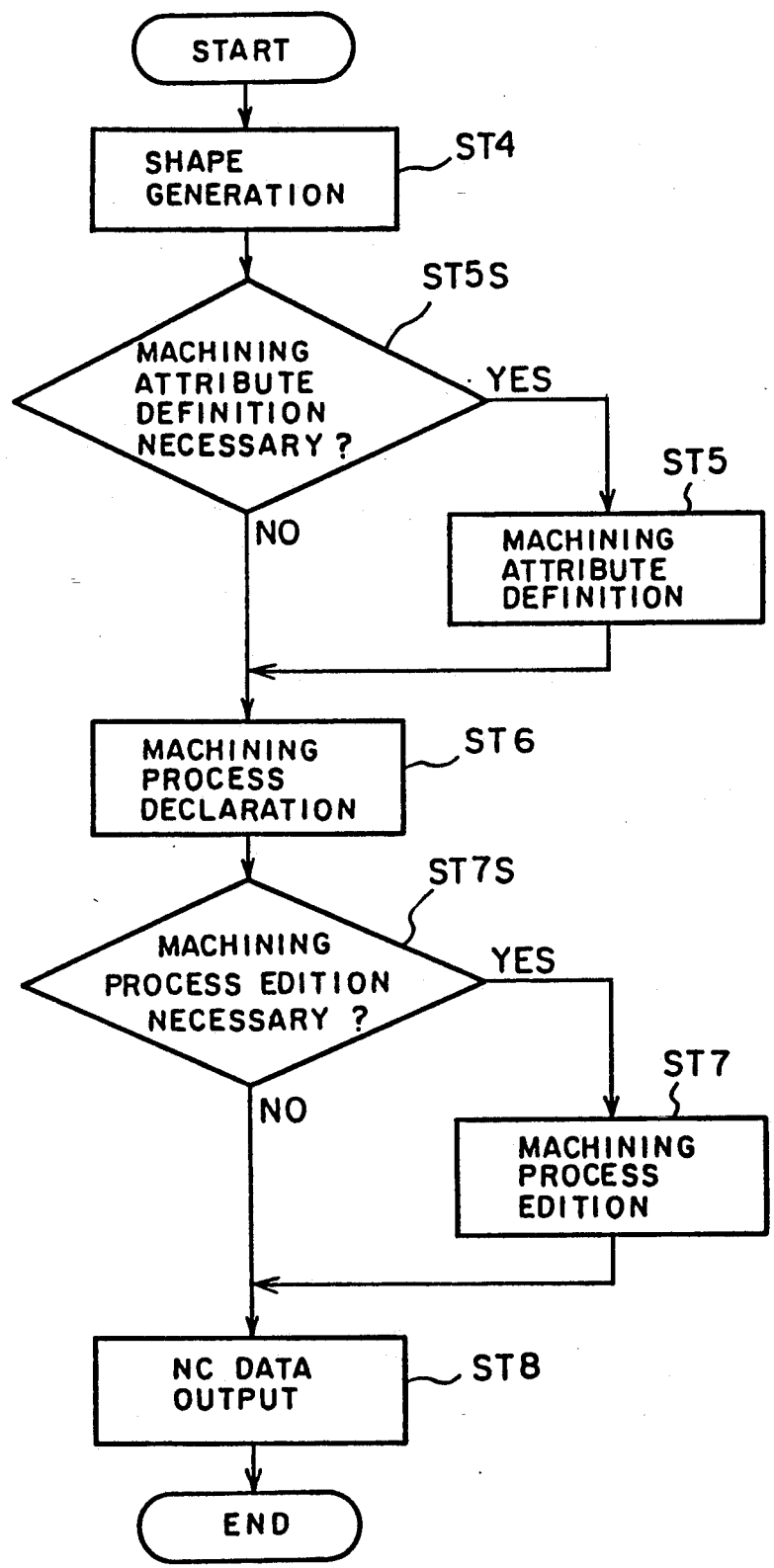
FIG. 11 is a flow chart showing operations in the apparatus of FIG. 10.
Figure 12:
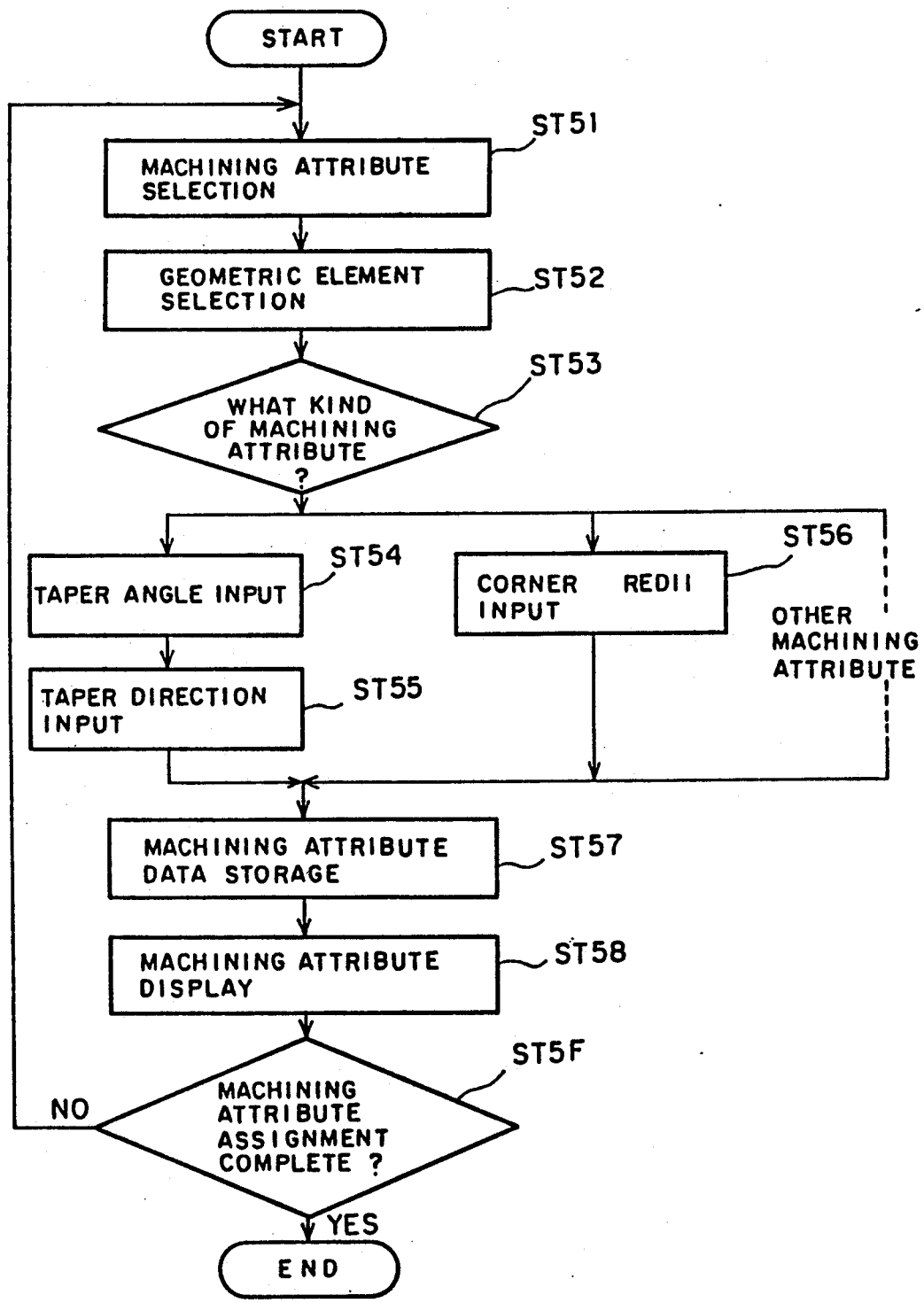

Each of the steps ST4, ST5, ST6, ST7, and ST8 in FIG. 11 is for performing reference to and storage of geometric shape, machining attribute, machining process data and the mutual dependence among the steps is not so strong. Therefore, the operator is allowed to make flexible operations in each of them not restricted by the sequence of transitions from step to step, number of times of execution, and the like. For example, after execution has been made up to the step ST8, if the geometric shape is to be corrected, the geometric shape may be corrected in step ST4 (for example, a corner R may be inserted into a of FIG. 9) and the NC data may be output once again in step ST8. Since the machining process data and the machining attribute data with respect to the geometric data are already produced, steps ST5, ST6, and ST7 need not be executed if there is no change. Although branches (step ST5S and step ST7S) were provided in FIG. 11 to give an overview of the flow of operations and processes, the steps, for example, ST4, ST5, ST6, ST7, ST8, etc. can be realized in the form to be freely selected and started up as commands or menu items at the same level in actual man-machine interface for the operator. Further, each of the steps ST4, ST5, ST6, ST7, and ST8 may be formed of a plurality of commands or menu items, by arranging, for example, such that "DEFINE LINE", "DEFINE CIRCLE", "INSERT CORNER R", "DELETE A SHAPE", etc. are provided for the geometric shape generation in step ST4.

In the case where provision of a machining attribute is not required (NO in step ST5S of FIG. 11) because the machining performed then is just "straight machining", the machining attribute data is not generated. As a result, it is decided at the time of outputting the NC data that there is no machining attribute (NO in step ST85 in FIG. 15), which poses no problem in the operation and processing. In other words, even if the definition of the machining attribute is omitted, other processes than those concerning the machining attribute are performed the same as in the case where the definition of the machining attribute is given.

Figure 3A:
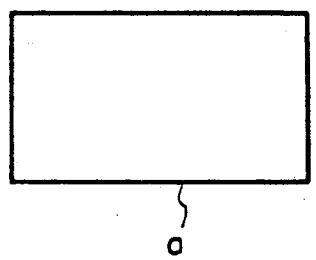
FIGS. 3(a) and 3(b) are drawings showing an example of a plurality of geometric shapes to be machined.
Figure 3B:
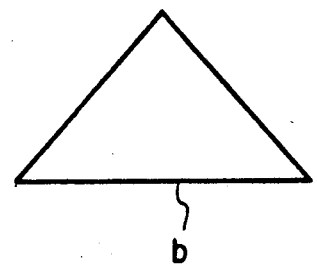

Now, the case as shown in FIGS. 3(a) and 3(b) where there are a plurality of shapes and, on one shape (a), rough-machining in a counterclockwise direction (referred to as machining process 1) and finish-machining in a clockwise direction (referred to as process 2) are performed will be considered. First, to the shape (a), a machining attribute is assigned (step ST5) as required and a machining process declaration is performed (step ST6). Then, machining process edition is performed (step ST7), wherein it is specified in the machining process table that both the process 1 and the process 2 are performed and necessary machining conditions and the like are input (steps ST74 to ST76). After the inputting, the input values are respectively stored as machining process information 1 and machining process information 2 in the machining process data memory 11 (step ST77). In like manner, machining attribute assignment (step ST5), machining process declaration (step ST6), and machining process edition (step ST7) are performed for the shape (b). If the machining process information for the shape (b) is denoted by machining process information 3, the internal data at this time are stored in the manner as shown in FIG. 6. Therein, the geometric elements 1 to 4 correspond to the shape (a) and the geometric elements 5 to 7 correspond to the shape (b). Then, if the process of NC data outputting (step ST8) is performed, NC data for performing rough-machining in a counterclockwise direction on the shape (a) and, in succession thereto, finish-machining in a clockwise direction, and then, machining of the shape (b) are output. Thus, it is possible, after assigning different kinds of machining, to output the NC data in a lump.

Figure 16:
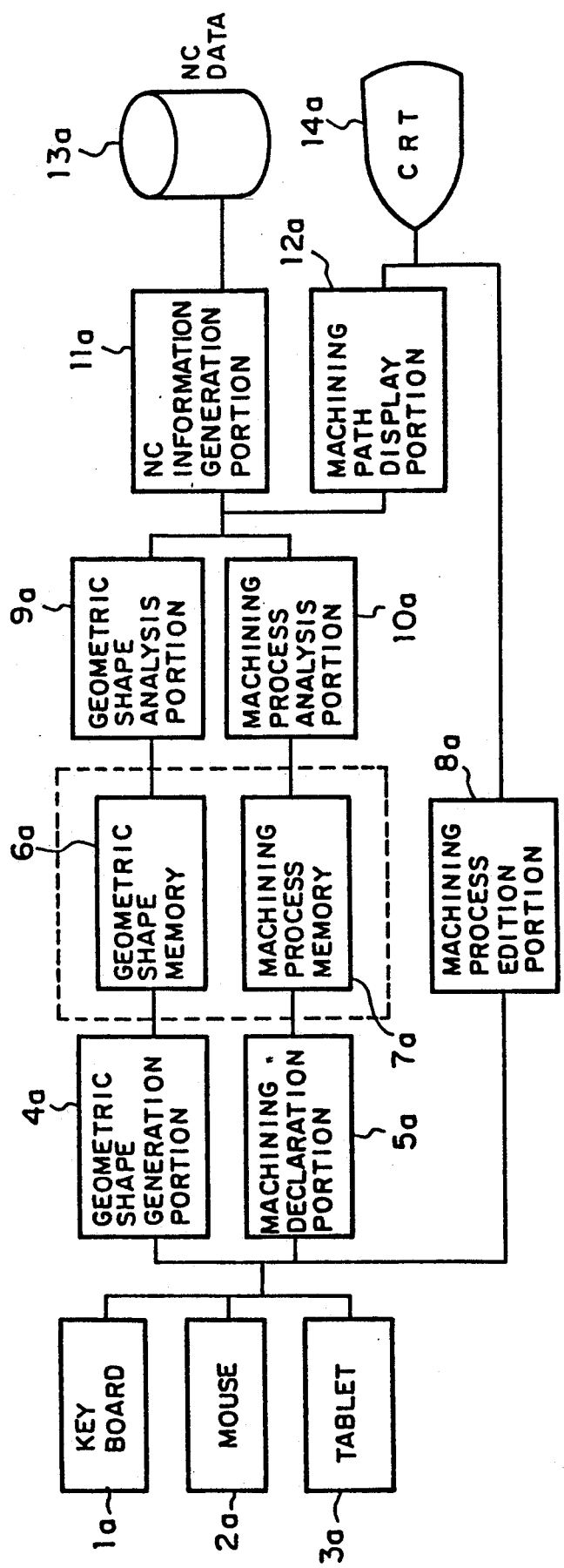
FIG. 16 is a block diagram showing a CAD/CAM apparatus of an embodiment according to a second aspect of the present invention.

Below will be described an embodiment according to a second aspect of the present invention with reference to the drawings. FIG. 16 is a block diagram showing structure of a CAD/CAM apparatus of the present embodiment, in which reference numerals 1a to 4a respectively correspond to those in the prior art apparatus. Reference numeral 5a denotes a machining declaration portion for generating machining process information, 6a denotes a geometric shape memory for storing geometric information, and 7a denotes a machining process memory for storing machining process information. Reference numeral 8a denotes a machining process edition portion for use in the edition of generated pieces of the machining process information, and 9a and 10a denote analysis portions of geometric information and machining process information, respectively. Reference numeral 11a denotes an NC information generation portion and 12a denotes a machining path display portion, these two portions being the portions finally outputting an NC program and a machining path diagram, respectively. Reference numeral 13a denotes the generated NC program and 14a denotes a CRT as a display device.

Figure 17:
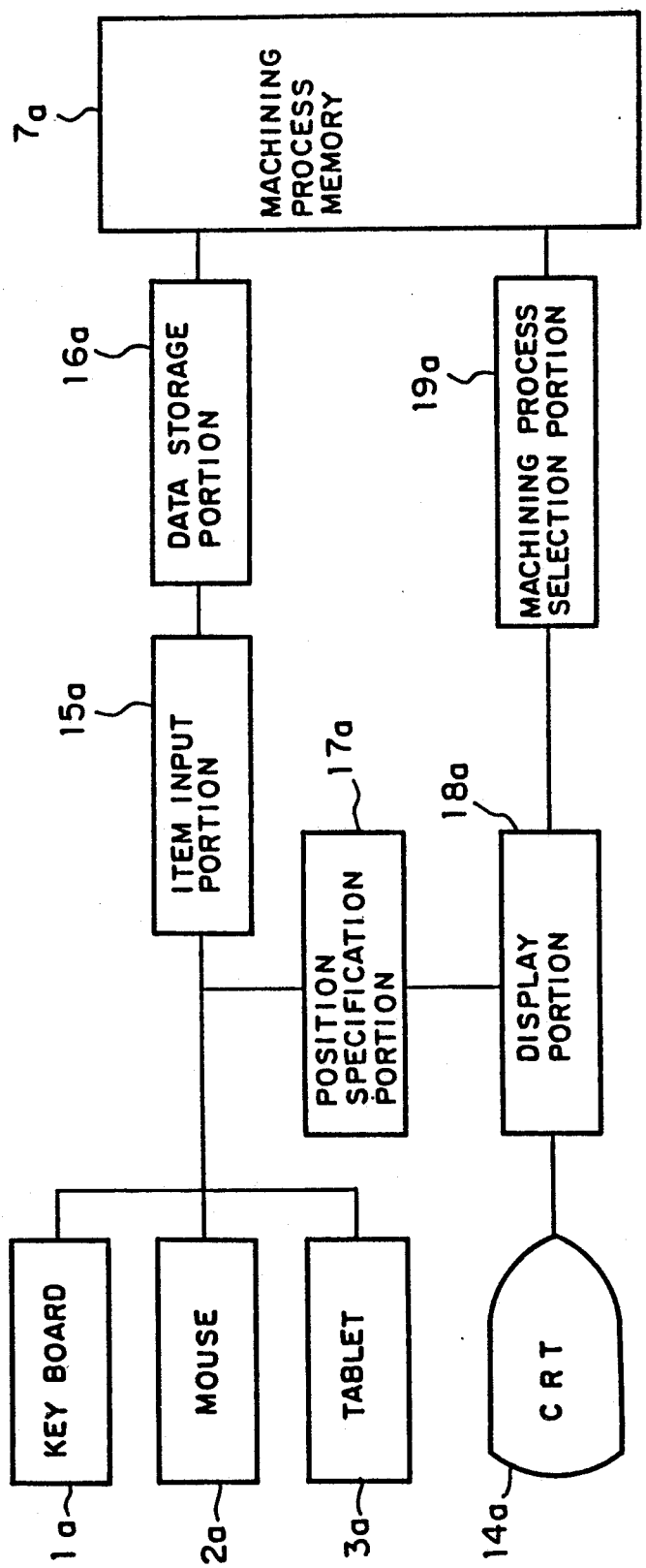
FIG. 17 is a block diagram showing a detailed structure of the machining process edition portion in FIG. 16.

FIG. 17 is a block diagram showing structure of the machining process edition portion 8a in FIG. 16, in which it is shown that the machining process edition portion 8a is made up of an item input portion 15a, a data storage portion 16a, a position specification portion 17a, a display portion 18a, and a machining process selection portion 19a.

Figure 18:
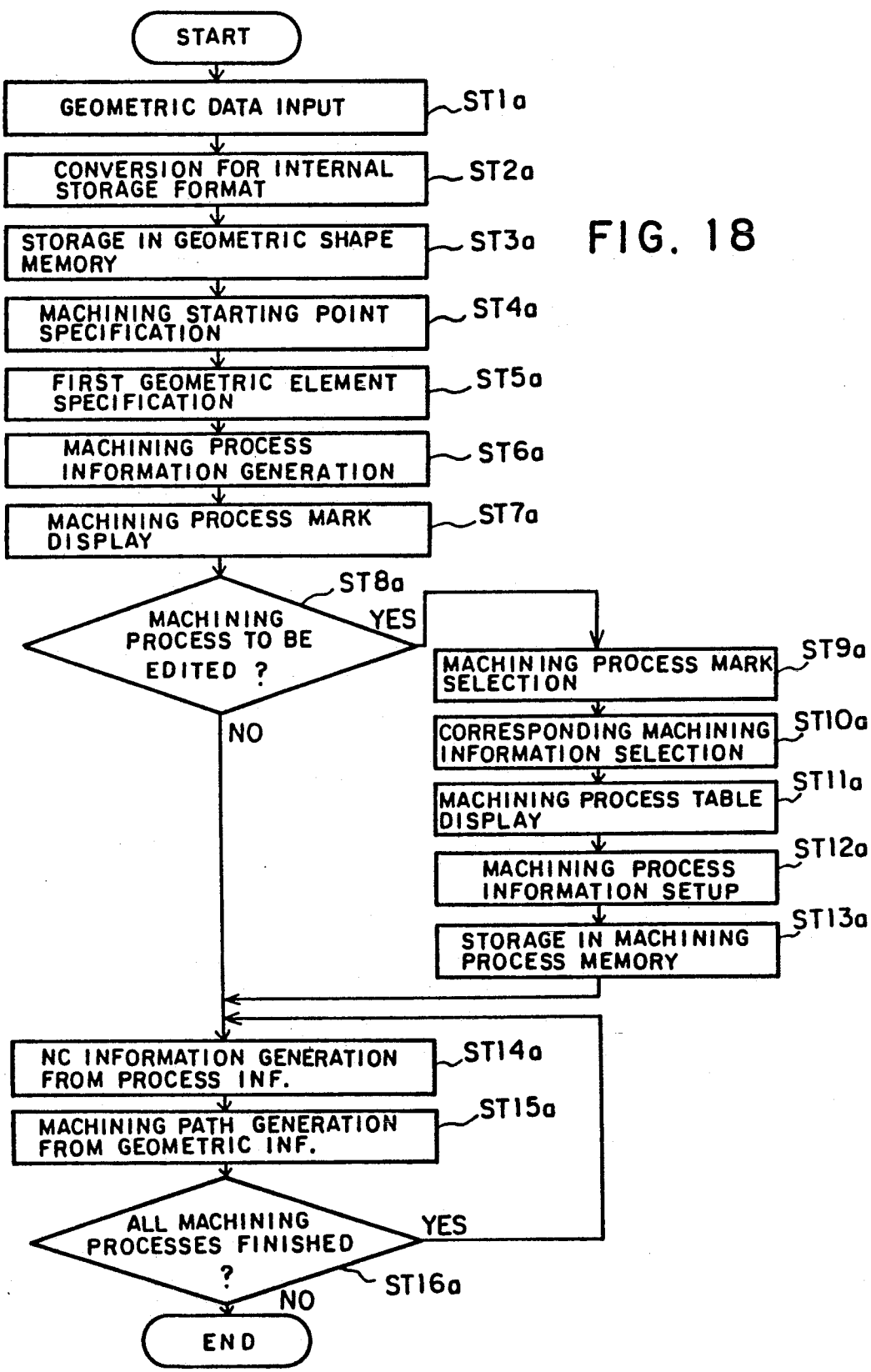
FIG. 18 is a flow chart showing an algorithm for outputting NC information.

Operation of the present CAD/CAM apparatus will be described below with reference to a flow chart shown in FIG. 18.

Figure 19:
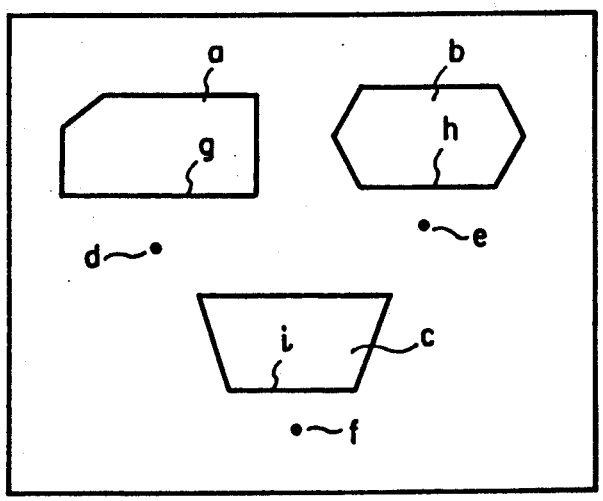
FIG. 19 to FIG. 21 are drawings showing pictures displayed on a CRT in the course of NC program generation with the use of the apparatus of FIG. 16.

First, geometric information is input from the input unit such as the keyboard 1a, mouse 2a, and the tablet 3a (step ST1a). The geometric shape generation portion 4a converts the geometric information into information adapted to the internal storage format (step ST2a) and the information is stored in the geometric shape memory 6a (step ST3a). An example of the picture displayed on the CRT at the time when the processes have been made up to the step ST3a is shown in FIG. 19. This figure shows an example where three kinds of shapes a to c are defined as the geometric information.

The declaration of machining these shapes is first made for the shape a by the specification of the machining starting point d made by the operator using the mouse or the like (step ST4a) and specification of the geometric element g (step ST5a) which is first to be machined when the machining is started from the machining starting point toward the shape. This process is controlled by the machining declaration portion 5a (step ST6a). At this time, the input information stored in the machining process memory 7a when the apparatus was used the last time is read out, and based on this information, machining process information is automatically generated. On the CRT, a mark indicating that the machining process information has been generated is displayed (step ST7a). This mark is displayed together with a number indicating the order of machining.

Figure 20:
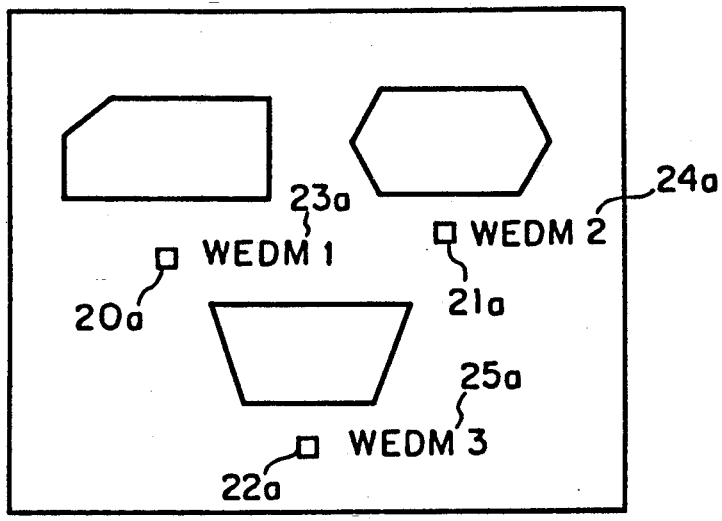

Then, similar declarations are made for the shape b by specifying e and h and for the shape c by specifying i and f. The order of declarations for these shapes becomes the order of machining. The display on the CRT after the machining declarations have been made for the shapes of FIG. 19 is shown in FIG. 20. Referring to FIG. 20, reference numerals 20a to 22a denote the marks indicating the machining starting points and 23a to 25a denote the marks for the machining process information. The numbers incidental to the marks represent the order of machining.

Figure 21:
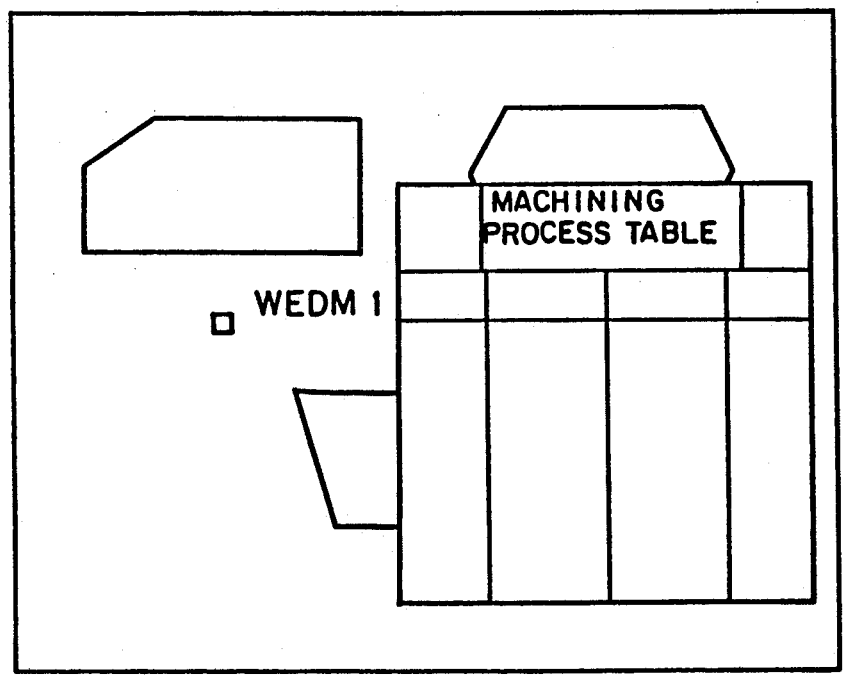

When pieces of machining process information of which declarations have already been made are edited (YES in step ST8a), the mark for the machining process (or the first geometric element) is specified (step ST9a). This selection is performed by the machining process selection portion 19a within the machining process edition portion shown in FIG. 17 (step ST10a), whereupon a table for inputting and editing various pieces of information for machining the shape in an interactive manner is displayed as shown in FIG. 21 (step ST11a). Necessary information is set up with the use of the table (step ST12a) and the information is stored in the machining process memory corresponding to each shape (step ST13a).

Figure 22:
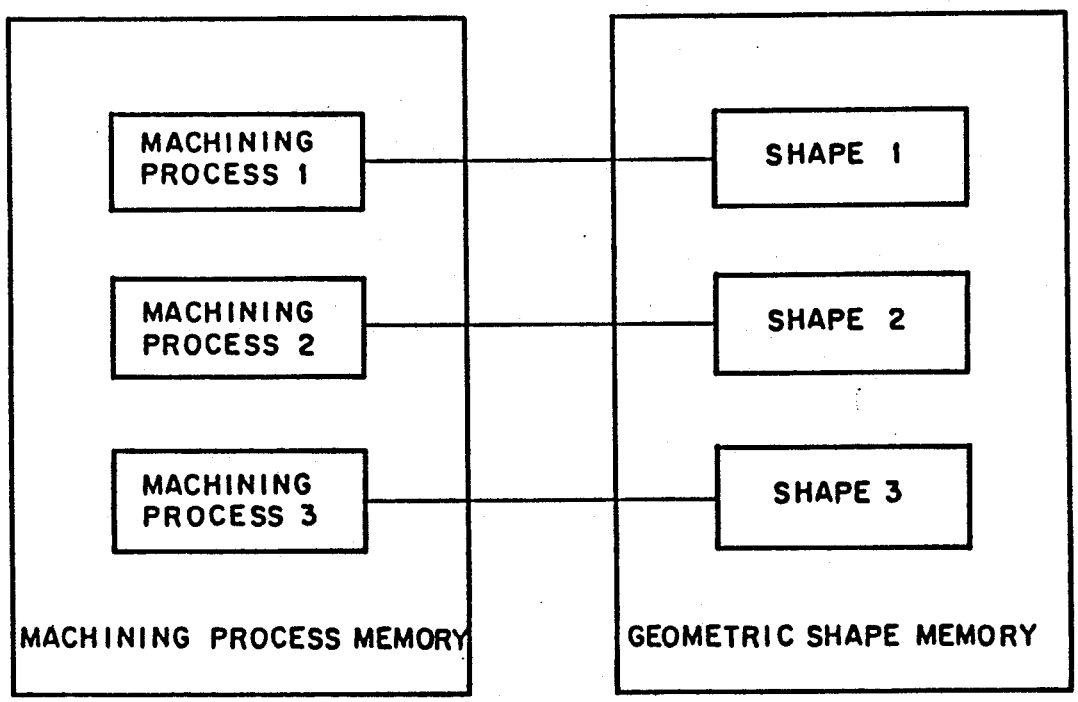
FIG. 22 is a drawing showing a method for storing data in a storage device.

FIG. 22 is a drawing showing the state of storage of information in the geometric shape memory 6a and the machining process memory 7a at the time when the declarations are made as shown in FIG. 20. The three sets of information in the geometric shape memory 6a correspond to three shapes in FIG. 19. In the machining process memory 7a, there are stored sets of machining process information corresponding to the three sets of information in the geometric shape memory 6a.

Details of the machining process table of FIG. 21 will be described with reference to FIG. 23. This machining process table is that showing an example of machining process table for outputting NC information for a wire-cut electrical discharge machine. The machining process table is controlled by the machining process edition portion 8a shown in FIG. 17. The lows represent patterns of machining, i.e., if data are input and increased along the lows, plural patterns of machining can be included. The columns of the machining process table represent pieces of information used for each pattern of machining. The operator can simply set up and change the contents of the machining process table using a keyboard 1a or the like. When the menu item "COMPLETE" in the table is selected with the mouse or the like, the input data in the table is stored into the machining process memory 7a and the table is closed. When the menu item "QUIT" is selected, the results of current inputting is abandoned and the table to be closed with the information set at the beginning held effective. It is of course possible, after the table has been closed, to open the table and set new information in it again and again by selecting the machining process mark (step ST9a).

The position specification portion monitors the position of the input item and transfers the data to the item input portion, and the data storage portion stores the data in the machining process memory 7a. The machining process table is always displayed by the display portion. The machining process table is capable of independently storing different contents for the individual set of machining process information. Therefore, by making machining declaration for each section of the geometric information, it becomes possible to define respective sets of machining information, accordingly.

When generating the NC program from the geometric shape and machining process information, the machining process analysis portion 10a refers to the machining process information at the head. At this step, a set of information for preparation of machine tools or the like is generated (step ST14a). Then, the geometric shape analysis portion 9a analyzes the corresponding geometric information and generates the machining path, i.e., the tool path (step ST15a). Upon completion of these operations for a set of machining process information, the same operations are performed for the next set of machining process information (step ST16a). These sets of information are transferred to the NC information generation portion 11a and the NC program is generated when analyses of all the sets of the machining process information are complete. The machining path display portion 12a converts the machining path information into graphic information and displays it on the CRT 14a.

The above embodiments have been described on the assumption that taper machining, machining of shapes different between upper and lower planes, and the like are performed by a wire-cut electrical discharge machine, but the embodiments can be applied also to outputting of NC data being compatible with various other machines such as machining center, milling machine, lathe, laser machine, and electrical discharge machine.

The above embodiments were described as to the case applied to a CAD/CAM apparatus, but the same can be applied to automatic programming apparatuses, automatic programming functions incorporated in NC apparatuses, and the like.

As described so far, the CAD/CAM apparatus according to the first aspect of the present invention is provided with a machining attribute definition means whereby assignment of a machining method to a portion of a geometric shape of an object is made possible, and further, provided with a machining process declaration means and a machining process edition means whereby specification and edition of machining processes for the shape of the object are made possible. Therefore, it provides an effect that fine specifications for machining is achieved easily. Since it can output various sets of NC data specifying different kinds of machining in a lump, it provides another effect that the processing time from the generation of geometric shapes to the outputting of the NC data can be shortened.

The CAD/CAM apparatus according to the second aspect of the present invention enables a set of machining information to be assigned to a portion of generated geometric information. Hence, when it is desired to make an NC program for machining some portion of a set of geometric information under different machining conditions from those for other portion, it is not needed to define the geometric shape after dividing the object of machining into two different shapes. Therefore, an effect is obtained that the efficiency in NC programming is improved, and this effect becomes greater according as the number of shapes are increased and the machining patterns are increased.

What is claimed is:

1. A CAD/CAM apparatus comprising:
   geometric shape generation means for generating a plurality of geometric shapes to be machined in an interactive manner with a display screen;
   machining attribute definition means for defining a machining attribute to be assigned to a desired geometric element of each geometric shape to be machined;
   machining process definition means for defining a machining process including a machining path, machining order of each geometric element of each geometric shape to be machined;
   storage means for storing machining attribute information and machining process information for each geometric element of each geometric shape to be machined;
   machining process edition means for re-editing the machining process information stored in said storage means over again according to a change in machining conditions; and
   NC information generation means for generating and outputting NC information on the geometric shapes to be machined including the machining attribute information and the machining process information for each geometric element of each geometric shape to be machined.

2. A CAD/CAM apparatus comprising:
   geometric shape generation means for generating a plurality of geometric shapes to be machined in an interactive manner with a display screen;
   machining declaration means for selecting desired one among geometric elements of each geometric shape to be machined, generating sets of machining process information formed of various kinds of machining information specifying machining processes of the geometric elements, and storing in storage means said sets of machining process information associated with the corresponding geometric elements;
   NC information generation means for determining a machining path based on said sets of machining process information and the geometric elements corresponding to said sets of machining process information to thereby generate NC information; and
   machining process edition means including
   machining process information selection means for selecting a set of machining process information from said storage means by specifying one among the geometric elements of the geometric shape to be machined of which a machining declaration has already been made, an identification name and identification number of the set of machining process information of which the machining declaration has already been made,
   machining process table display means for displaying the selected machining process information in a form of a machining process table on the display screen, said machining process table displaying types of machining processes and items related to said type of the machining processes in columns and plural process items indicating the machining order in rows of the table,
   input item position specification means for selecting any desired item position in said machining process table to which position necessary data are to be input,
   item input means for inputting the necessary data to said input item position being selected, and
   machining process information storage means for storing said input necessary data as machining process information.

3. A CAD/CAM apparatus according to any one of claims 1 and 2, wherein said NC information generation means outputs NC information being compatible with a wire-cut electrical discharge machine.

4. A CAD/CAM apparatus according to any one of claims 1 and 2, wherein said NC information output means outputs NC information being compatible with a machining center, a milling machine, a lathe, a laser machine, and an electrical discharge machine.

5. An automatic NC programming apparatus having a CAD/CAM apparatus according to any one of claims 1 and 2 as automatic programming means.

6. An NC apparatus having a CAD/CAM apparatus according to any one of claims 1 and 2 as automatic programming means.

* * * * *